(12) United States Patent
Kelrich

(10) Patent No.: US 9,129,202 B2
(45) Date of Patent: Sep. 8, 2015

(54) DEVICE FOR AUTOMATED FUEL DELIVERY AUTHORIZATION AND METHOD FOR INSTALLATION THEREOF

(75) Inventor: David Kelrich, Ramat Hasharon (IL)

(73) Assignee: ORPAK SYSTEMS LTD., Bnei Brak (IE)

( * ) Notice: Subject to any disclaimer, the term of this patent is extended or adjusted under 35 U.S.C. 154(b) by 65 days.

(21) Appl. No.: 13/884,993

(22) PCT Filed: Nov. 14, 2011

(86) PCT No.: PCT/IB2011/055069
§ 371 (c)(1),
(2), (4) Date: May 29, 2013

(87) PCT Pub. No.: WO2012/066463
PCT Pub. Date: May 24, 2012

(65) Prior Publication Data
US 2014/0097255 A1    Apr. 10, 2014

Related U.S. Application Data

(60) Provisional application No. 61/413,801, filed on Nov. 15, 2010.

(51) Int. Cl.
*G06K 19/077* (2006.01)

(52) U.S. Cl.
CPC .... *G06K 19/07758* (2013.01); *G06K 19/07749* (2013.01); *Y10T 29/49016* (2015.01)

(58) Field of Classification Search
CPC .................................................... G06K 19/077

USPC ........................................................... 235/492
See application file for complete search history.

(56) References Cited

U.S. PATENT DOCUMENTS

| | | | | |
|---|---|---|---|---|
| 6,050,622 A * | 4/2000 | Gustafson | ................. | 292/307 R |
| 6,899,151 B1 * | 5/2005 | Latka et al. | ................... | 141/392 |
| 2002/0036237 A1 * | 3/2002 | Atherton et al. | ............... | 235/492 |
| 2006/0087431 A1 * | 4/2006 | Shieh et al. | ................. | 340/572.1 |
| 2010/0214101 A1 * | 8/2010 | Baba et al. | .................. | 340/572.9 |

FOREIGN PATENT DOCUMENTS

KR    2005093502 A *    9/2005    ............... H02G 3/30

OTHER PUBLICATIONS

OPW Fuel Management Systems. Vehicle Information Unit (VIU) Installation & Service Manual [online], 2002 [retrieved on Nov. 7, 2014] Retrieved from the Internet:< URL: http://www.opwglobal.com/Libraries/OPW-FMS_Manuals/M00-017_00_FleetLINK_Vehicle_Installation_Service_Manual.sflb.ashx>.*

* cited by examiner

*Primary Examiner* — Thien T Mai
*Assistant Examiner* — Toan Ly
(74) *Attorney, Agent, or Firm* — The Law Office of Joseph L. Felber (57) ABSTRACT

The present invention relates to a device for automated and secure fuel delivery authorization and in particular, to such a device in which fuel delivery authorization device comprises a vehicle RFID tag disposed on the filler neck of a vehicle having a simplified installation process.

19 Claims, 12 Drawing Sheets

DEVICE FOR AUTOMATED FUEL DELIVERY AUTHORIZATION AND METHOD FOR INSTALLATION THEREOF

This Application is a national phase of, and claims priority from, PCT Application No. PCT/IB2011/055069, filed on Nov. 14, 2011, which claims priority from U.S. Provisional Application No. 61/413,801, filed Nov. 15, 2010, which is hereby incorporated by reference as if fully set forth herein.

FIELD OF THE INVENTION

The present invention relates to a device for automated and secure fuel delivery authorization and in particular, to such a device in which fuel delivery authorization device comprises a vehicle RFID tag disposed on the filler neck of a vehicle having a simplified installation process.

BACKGROUND OF THE INVENTION

RFID tags and readers have been used in the fuel delivery supply chain process for many years. State of the art automated fuel delivery authorization systems rely on wireless RFID tag and reader communication to verify user identification, user information, vehicle information, fuel information, fueling habits and the like data associated with the refueling process.

However, current state of the art automated fuel delivery authorization systems are primarily available only to vehicles that form are a part of a fleet and are not readily available for non fleet vehicle such as privately owned cars. This lack of availability to the individual vehicle owners (herein referred to as "non-fleet vehicle") is primarily due to the cost of vehicle tags themselves and to the lengthy and costly process of installing RFID vehicle devices in the vehicle.

SUMMARY OF THE INVENTION

The present invention provides a cost effective, tamperproof RFID vehicle tag, that may be readily installed on the vehicle fuel delivery neck. Preferably the installation process is simplified such that an untrained individual and/or layperson may perform the installation without use of labor intensive tools, beyond those provided in a kit comprising the invention. Most preferably, the device and method of the present invention provide for a vehicle tag that may be integrated and/or used with any systems for automated, prepaid and/or pre-authorized fuel delivery authorization.

A preferred embodiment of the present invention provides for a device in the form of a tamperproof vehicle RFID tag, that may be installed in an easy manner about the vehicle's fuel delivery neck. Most preferably the tamperproof RFID tag device according to the present invention may be incorporated into a band that may be wrapped about and coupled the outer perimeter of the vehicle fuel delivery neck. Optionally and preferably the band may be provided in a plurality of optional forms and/or materials for example including but not limited to zip tie, band and buckle, worm-gear hose clamp, clamp, steel clamp, cable tie, strip hose clamp, clamping band or the like band and buckle assembly.

Most preferably the tamperproof vehicle RFID tag according to the present invention comprises a head portion and a tail portion. Most preferably the tail portion may be provided in the form of a zip tie tail adapted for wrapping, clamping and/or otherwise securely associated the tamperproof vehicle RFID tag around the vehicle filler neck. Optionally and preferably tail portion may be provided from bendable, malleable and/or pliable materials for example including plastic, metal, hybrids, composites, any combination thereof or the like as is known in the art of bands, clamps, zip ties or the like.

Most preferably the tail portion comprises and/or is integrated with a conducting wire and/or materials to able to create and/or close a circuit. Most preferably the integrated conducting wire and/or material spans the length of the tail portion. Most preferably the integrated conducting wire and/or material are coupled with the head portion with at least two or more contacts, connectors, corresponding male or female contacts or the like.

Optionally and preferably the tail portion may further comprise a plurality of conducting wires and/or the like conductive materials that span the length of the tail portion forming a plurality of loops along the length essentially forming a coil and/or solenoid. Optionally the wire and/or conducting material may be provided in a plurality of shapes, for example including but not limited to straight, coiled, wave-like, zig-zag, looped, sinusoidal, geometric shape or the like.

Optionally and preferably the tail portion may further comprise a segment comprising a wire coil formed in line with the tail portion band. Most preferably the in-line coil is provided from a continuous wire embedded within tail portion band, and spanning the length of the tail portion. Optionally and preferably the coil segment extends outwardly from the tail portion, therein forming a segment having a raised surface that preferably may be seamless and continuous with the tail portion band. Most preferably the coil is disposed along the tail portion within a housing seamlessly extending from the outer and/or external surface of the tail portion, such that the coil housing is continuous and fluid with the tail portion band.

Most preferably the head portion comprises a housing that is continuous with the tail portion such that the tail portion seamlessly extends from the head portion. Most preferably the head portion is adapted to house the RFID chip and a tail fastening tool.

Optionally and preferably head portion housing comprises the RFID chip and corresponding circuitry that provides for wireless, contactless, near field, communication with an external RFID refueling authorization system, for example, to communicate directly with a refueling RFID reader disposed on a refueling nozzle.

Most preferably RFID chip and circuitry are adapted to provide at least one or more tamperproof measures, optionally and preferably at least two or more tamperproof measures, for securing the integrity of the RFID tag about its tail portion or head portion. Optionally and preferably the tamperproof measures provide for safeguarding against tampering where, once the vehicle tag is in its permanent place, about the vehicle fuel filler neck, an attempt to physically move or remove the RFID tag from its permanent position, at about at least one or both of its tail portion and/or head portion, renders the tag non-functional and/or irreparable.

Optionally and preferably at least one or more tamperproof measure provides for rendering the RFID tag chip, disposed about the head portion, non-functional and/or irreparable once a removal attempt is made about the head portion.

Optionally and most preferably at least one or more tamperproof measure is provided in the vehicle RFID tag tail portion comprising a conducting wire or the like conducting materials, wherein if attempts are made to remove the RFID tag via its tail portion, for example by cutting the tail portion, would render the RFID tag circuitry disposed about the head portion non-functional as the circuit would be broken. Most preferably the conducting wiring integrated and embedded within the tail portion.

An optional embodiment of the present invention provides for an RFID vehicle tag assembly comprising the tamperproof vehicle RFID tag according to an optional embodiment of the present invention, a coil, and a plurality of peripheral bands. Most preferably a tamperproof vehicle RFID tag may be physically coupled or otherwise associated with the coil via a plurality of peripheral bands, therein optionally forming a concentric structure comprising an inner circle formed from the tamperproof RFID vehicle tag, and an outer circle formed from the coil. Most preferably while a plurality of peripheral bands couple the inner circle and outer circle the tamperproof RFID vehicle tag is electronically coupled with the coil via a wire. Optionally and preferably coupling of tamperproof RFID vehicle tag and the coil may be mediated by a connector, adaptor, coupler or the like for example in the form of a male/female connectors as is known in the art.

Optionally and preferably once deployed, the plurality of peripheral bands, form a bridge between the coil and vehicle RFID tag. Optionally and preferably peripheral bands are provided so that they loop about both coil and vehicle RFID tag. Most preferably peripheral bands are provided in the form for example including but not limited to zip tie, Band and buckle, worm-gear hose clamp, clamp, steel clamp, cable tie, strip hose clamp, clamping band or the like band and buckle assembly, any combination thereof or the like.

An optional embodiment of the present invention provides for a kit for a RFID assembly in a ready to install format comprising the tamperproof RFID vehicle tag as previously described, a coil, a plurality of peripheral bands, and a tamperproof RFID vehicle tag fastening tool.

An optional embodiment of the present invention provides for an RFID vehicle tag assembly comprising the tamperproof vehicle RFID tag according to the present invention comprising a coil segment disposed about the tail portion and a fastening tool.

An optional embodiment of the present invention provides for a method for installing the tamperproof RFID vehicle tag according to the present invention the method initiated by identifying installation location about a fuel tank's filler neck. Optionally, next activation of an optional tamperproof measure by deploying a pin that most preferably is adapted to render the RFID chip irreparable and/or non-functional once it is moved, removed and/or repositions following deployment, optionally this stage may be performed during manufacturing. Next a laminate associated with the RFID vehicle tag is removed to uncover the adhesive surface of a double sided adhesive cover and/or medium. Next the assembly is placed over the filler neck at the predetermined location and couple with a first (outer) adhesive surface. Optionally and preferably the double sided adhesive medium is provided both to adhere to the filler neck (first or outer adhesive surface) as well as the deployment pin (with a second or inner adhesive surface), therein most preferably securely coupling and engaging the two surfaces, therein forming an optional and preferred tamperproof measure, wherein movement of the apparatus from the filler neck location would render the RFID chip irreparable and/or non-functional once it is moved, removed and/or repositions following deployment. Finally the tail portion is tightened about the filler neck to ensure a secure fit.

Unless otherwise defined the various embodiment of the present invention may be provided to an end user in a plurality of formats, platforms, and may be outputted to at least one of a computer readable memory, a computer display device, a printout, a computer on a network or a user.

Unless otherwise defined, all technical and scientific terms used herein have the same meaning as commonly understood by one of ordinary skill in the art to which this invention belongs. The materials, methods, and examples provided herein are illustrative only and not intended to be limiting. Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1D-F provide varying views of a schematic non limiting illustrative diagram of a vehicle tag according to an optional embodiment of the present invention of a vehicle tag with an in-line tail portion coil, FIG. 1D shows an optional schematic illustrations of an assembled vehicle tag;

DESCRIPTION OF THE PREFERRED EMBODIMENTS

The present invention is of a device and a method for automated and/or preauthorized fuel delivery using an easy to install RFID vehicle tag that may be integrated with any state of the art fuel delivery system.

The principles and operation of the present invention may be better understood with reference to the drawings and the accompanying description.
The following reference labels listed below are used throughout the drawings to refer to objects having similar function, meaning, role, or objective. Throughout the description of the drawings similarly named parts and labels are used throughout to identify similarly functioning components portions.
- 100 kit and assembly for easy installation of vehicle tag;
- 120 tamperproof vehicle tag;
- 121 tamperproof vehicle tag;
- 122 tail portion;
- 122s tail portion teeth;
- 122w tail portion wire;
- 123a coil housing;
- 123b coil core;
- 123c coil housing cover;
- 123w coil looped wiring ;
- 124 peripheral band body;
- 124a peripheral band fixed end ;
- 124b peripheral band open end;
- 124L peripheral band lock;
- 126 fastening tool;
- 126t fastening gear;
- 128 coil;
- 128c coil connectors;
- 128w coil wires and/or leads;
- 130 RFID vehicle tag head portion;
- 130i head portion inner surface;
- 130o head portion outer surface;
- 132 head portion housing;
- 134 vehicle tag circuitry;
- 134c vehicle tag contacts ;
- 134f vehicle tag circuitry female tamperproof connector;
- 135 circuitry housing;
- 136 vehicle tag circuitry male tamperproof connector or slider;
- 136m vehicle tag circuitry male tamperproof connector pin;
- 138 double sided adhesive housing cover;
- 138o outer (first) adhesive surface;
- 138i inner (second) adhesive surface.

Figure 1A:
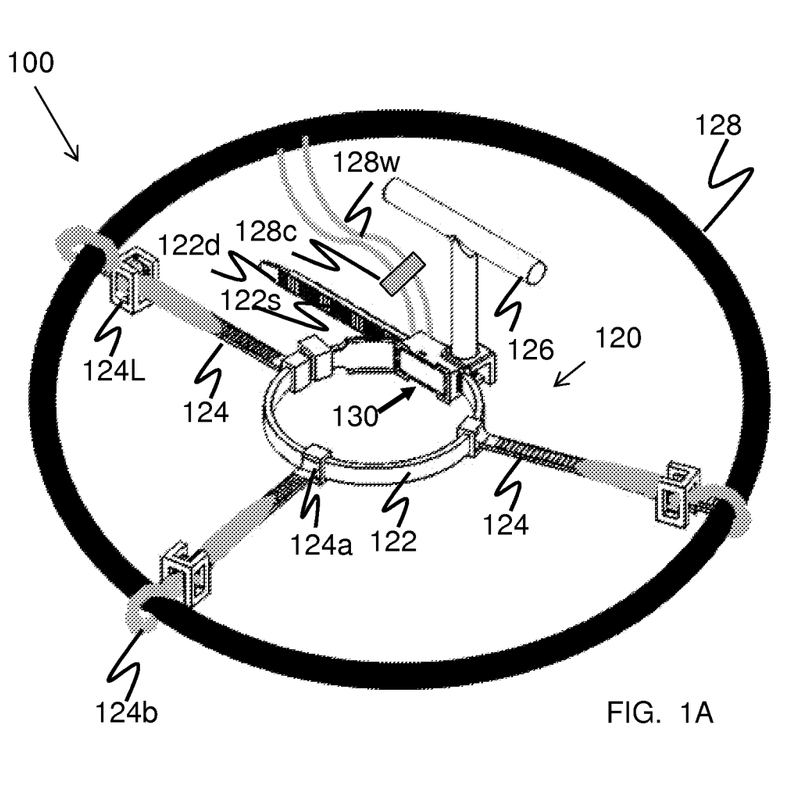
FIG. 1A-C provide varying views of a schematic non limiting illustrative diagram of a vehicle tag according to an optional embodiment of the present invention, FIG. 1A and 1C provide optional schematic illustrations of an vehicle tag device while FIG. 1B provides preassembled view of the vehicle tag device.
Figure 1B:
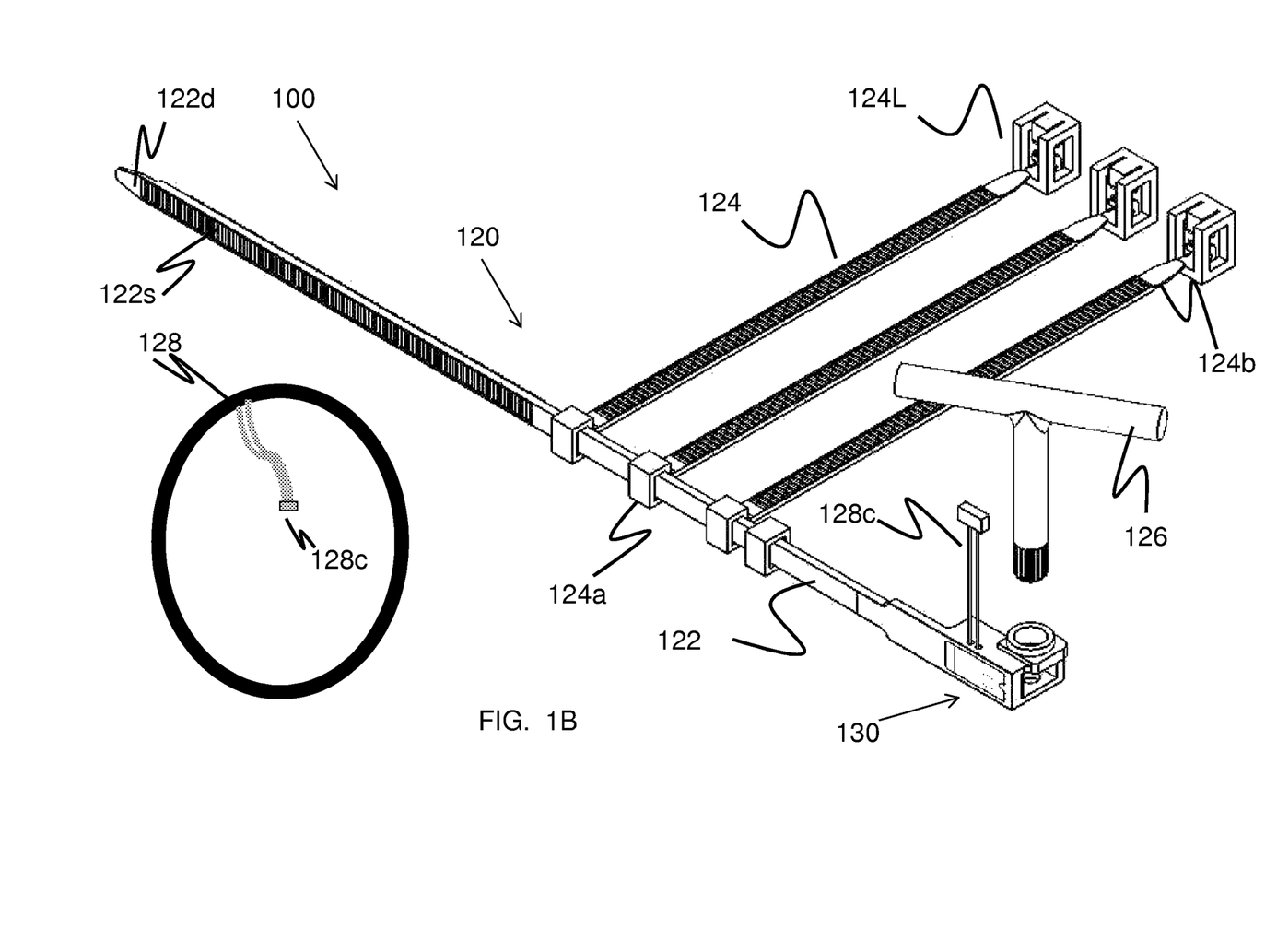
Figure 1C:
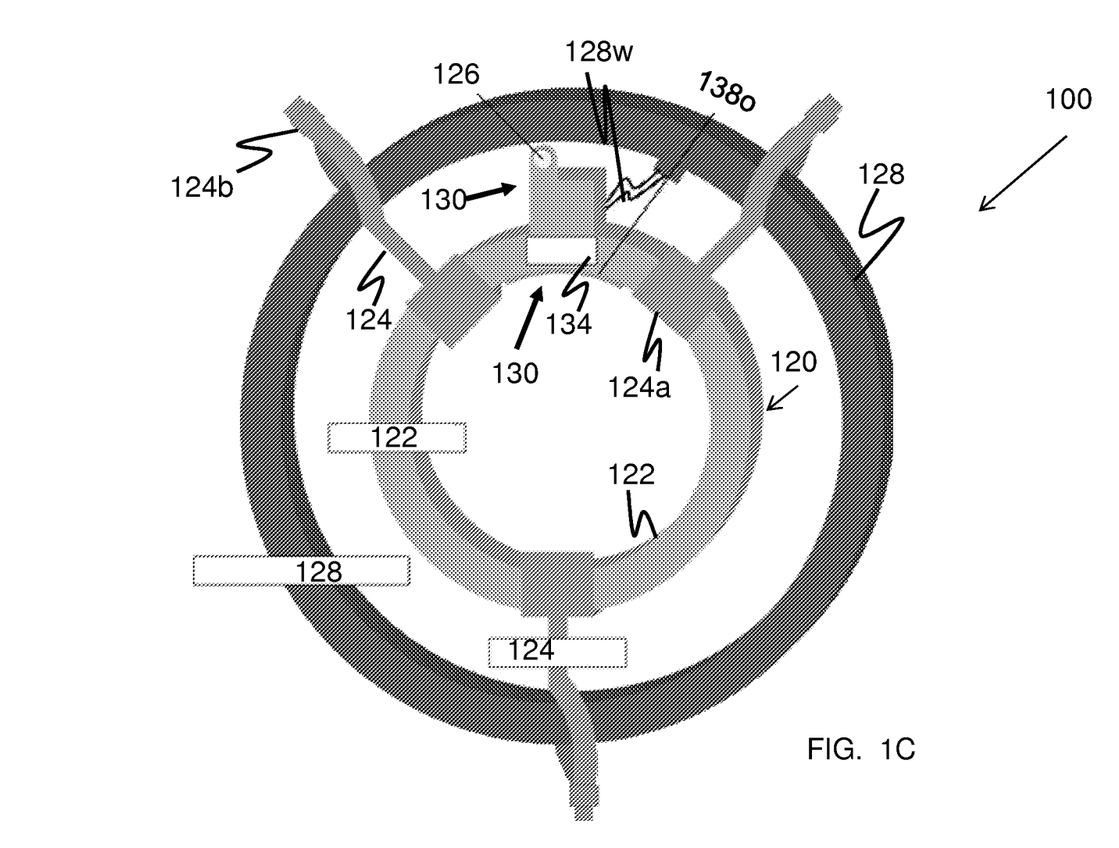

FIG. 1A and 1C show an assembled apparatus and kit 100 while FIG. 1B shows a preassembled apparatus 100, according to optional embodiment of the present invention for a tamperproof vehicle side RFID tag. Kit 100 comprises RFID coil 128, a plurality of peripheral band 124, a tamperproof vehicle side RFID tag 120, and fastening tool 126.

Apparatus and/or kit 100 comprising a tamperproof vehicle side RFID tag 120 comprising a tag tail 122 provided for associated with and securely fastening to fuel delivery filler neck (not shown), and a head portion 130 comprising vehicle tag circuitry. Most preferably tail portion 122 is provided to form a loop utilized to associated apparatus 100 over filler neck (not shown). Most preferably tail portion 122 loop is provided by associating and/or coupling tail portion distal end 122d with head portion 130 forming a loop that may be tightened with fastening tool 126, optionally and preferably about filler neck (not shown).

Most preferably tag 120 is provided in the form of a band where its tail portion 122 comprising gear rack and/or cogs and/or, teeth 122s, or the like about its surface that may be uni-directionally coupled and securely fit with head portion 130 about an internal fastener, latch, ratchet, pawl and/or catch (not shown) corresponding to the teeth 122s, as is known in the art. Most preferably band 120 may be provided in a plurality of optional forms and materials for example including but not limited to zip tie, band and buckle, worm-gear hose clamp, clamp, steel clamp, cable tie, strip hose clamp, clamping band or the like band and buckle assembly, any combination thereof or the like.

Most preferably tamperproof tag 120 comprises tail wire 122w (FIG. 1E, 1H, 2E-F) embedded within tail portion 122. Most preferably tail wire 122w provides a tamperproof measure such that if band 122 is cut about its tail portion 122 it severs and/or cuts tail wire 122w rendering tag 120 inoperable, non-functional and/or irreparable.

Most preferably vehicle tag 120 is electronically coupled with a coil 128 via wires 128w. An optional embodiment , for example as shown in FIG. 1A-C provides for electronically coupling vehicle tag 120 with coil 128 about head portion 130 where the coupling is mediated with a connector 128c for example including but not limited to a male/female connector. Most preferably coil 128 provides and serves as a RFID coil antennae provided for communicating data on vehicle tag 120.

Optionally tail portion 122 may be physically and securely associated to coil 128 with a plurality of peripheral bands 124 at fixed end 124a. Peripheral band 124 further comprises an open end 124b that may be provided to associate with coil 128. Most preferably band 124 physically couples and/or bridges RFID tag 120 with coil 128 by folding open end 124b over coil 128 and locking open end 124b with peripheral band lock 124L.

Figure 1D:
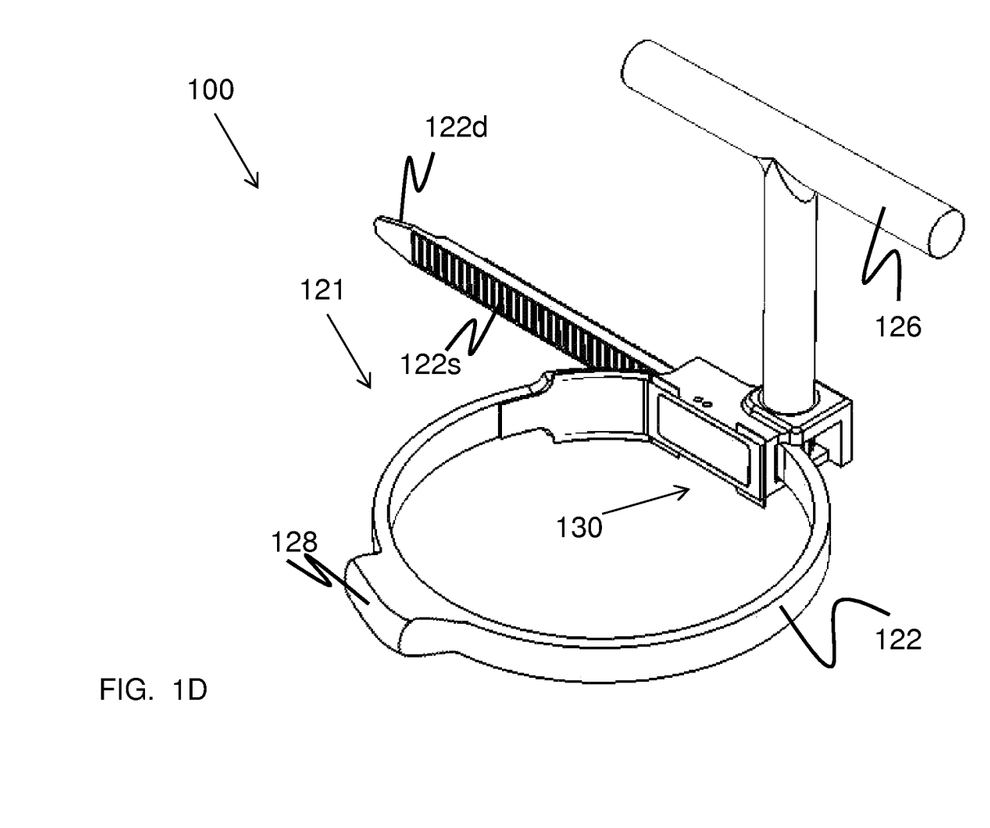
Figure 1E:
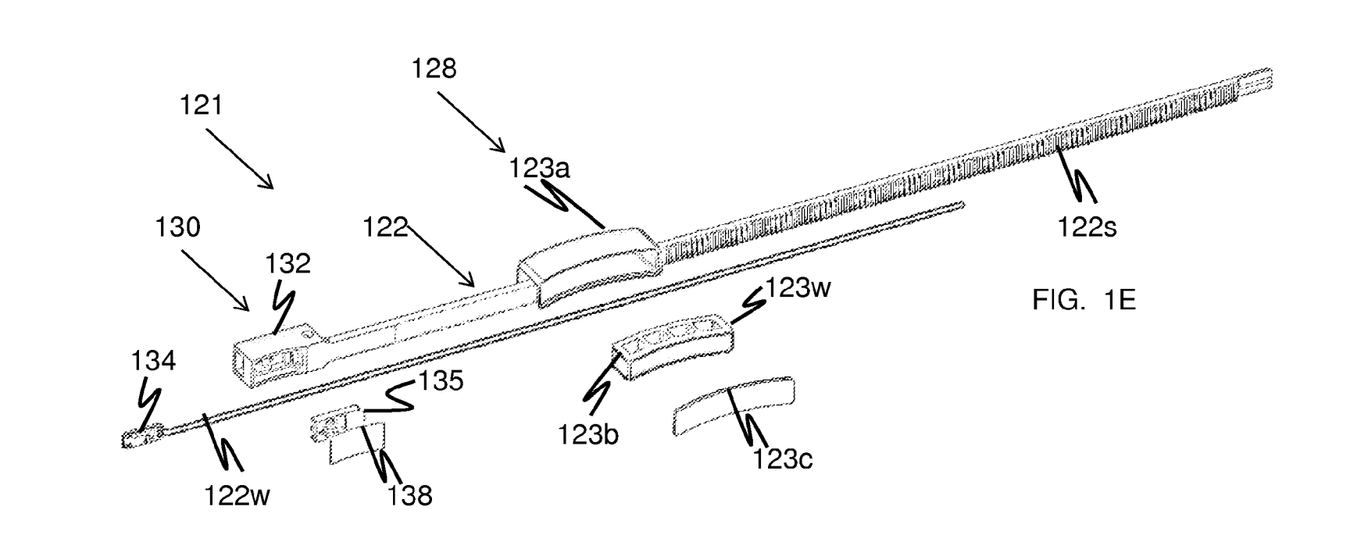
FIG. 1E provides an exploded view of the vehicle tag and FIG. 1F shows a side view of the tag shown from the underside.
Figure 1F:
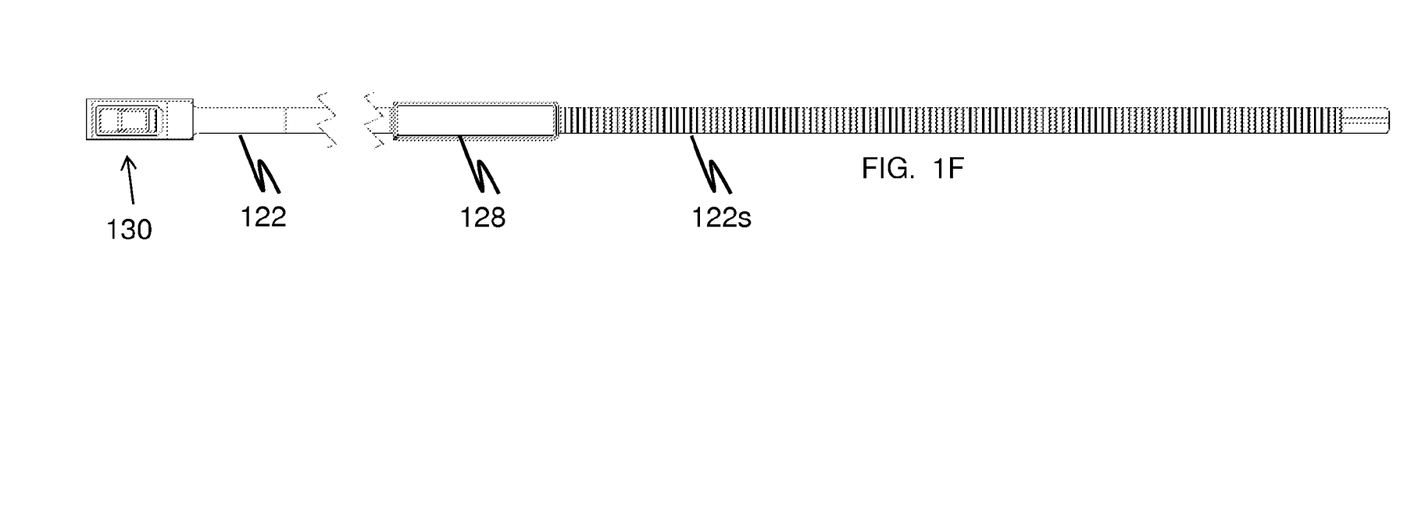

Now referring to FIGS. 1D-F, show an optional embodiment of the present invention where vehicle tag 121 comprises an integrated coil 128 about its tail portion 122. FIG. 1D shows an assembled apparatus and kit 100 comprising vehicle tag 121, and fastening tool 126. Most preferably apparatus 100 is provided for fitting over a vehicle's fuel delivery filler neck (not shown) in a simple and easy, "do it yourself" type installation manner. Most preferably vehicle tag 121 is a tamperproof tag, comprising at least one or more tamperproof measures, such that when attempt is made to remove it from the filler neck tag 120 will be rendered inoperable and/or non-functional.

Tag 121 comprises an integrated coil 128 provided about tail portion 122 and most preferably electronically coupled with tail wire 122w disposed internally along the length of tail portion 122. Optionally coil 128 wiring 123w may be electronically coupled with tail portion wire 122w with at least one or more couplers for example a male and/or female connectors and/or couplers.

Most preferably tail wire 122w provides a tamperproof measure such that if band 121 is cut about its tail portion 122 it severs and/or cuts tail wire 122w rendering tag 121 inoperably, non-functional and irreparable.

FIG. 1E shows an exploded view of tag 121 comprising head portion 130 and tail portion 122. Most preferably head portion 130 comprises RFID tag circuitry 134, tag circuitry housing 135 and head portion housing cover 138. Most preferably housing cover 138 comprises two adhesive surfaces about both its internal and outer surfaces, provided as a preferred and optional tamperproof security measure.

Most preferably tag circuitry 134 is electronically coupled with tail wire 122w. Most preferably tail wire 122w is embedded within and along the length tail portion 122, Tail portion 122 is provided in the form of a band for example in the form of a zip tie, tie band or the like. Most preferably tail portion 122 comprises gear rack and/or cogs and/or, teeth 122s about at least a portion of its length for locking band 122 with head portion 130.

Optionally and preferably tail portion 122 comprises a housing 123a forming coil 128 along its length. Coil 128 may be formed within housing 123a adapted to receive core 123b, FIG. 1G, having wound and/or coiled wire 123w wound thereabout and sealed with a cover 123c.

Figures 1G, 1H:
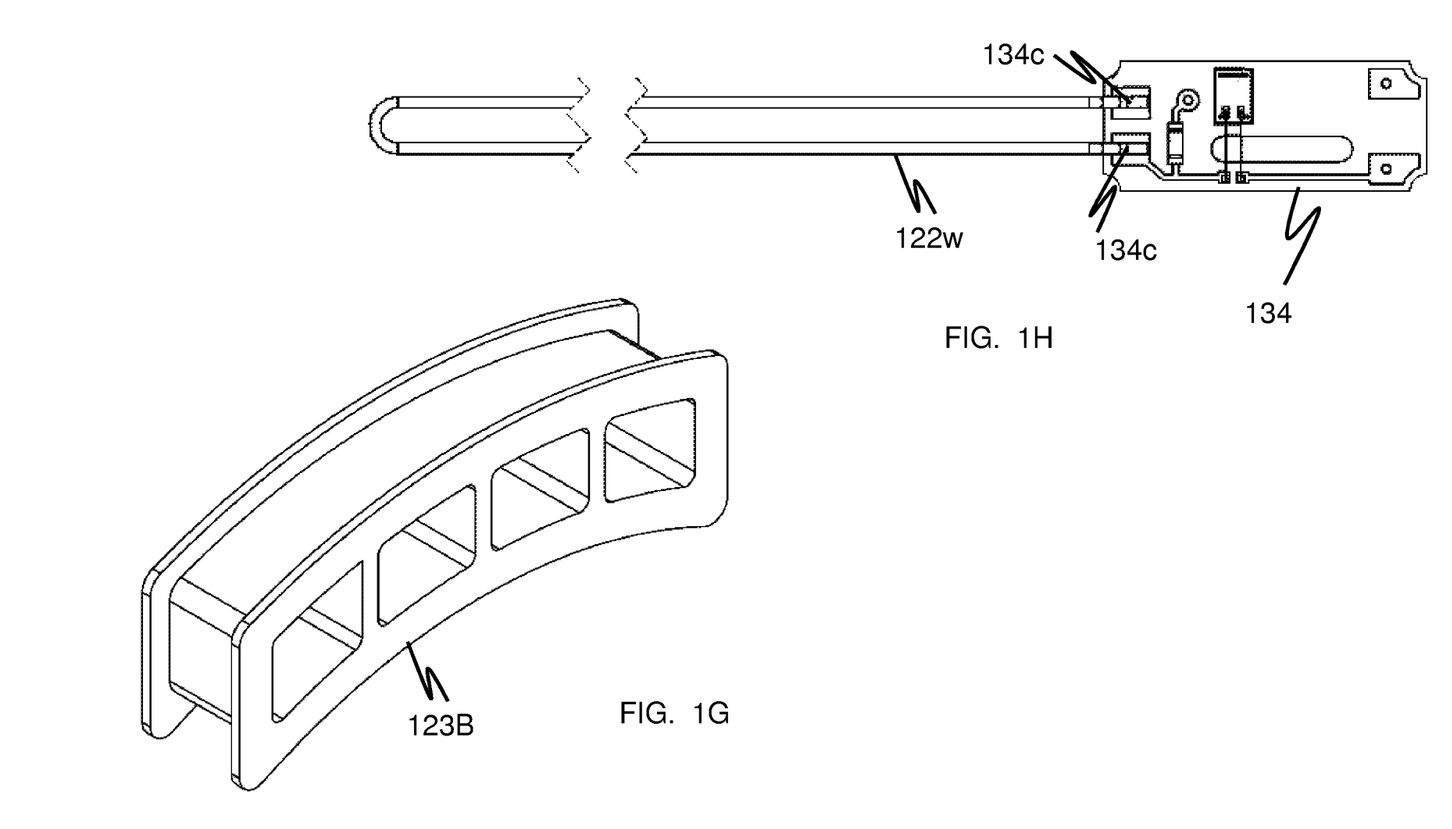
FIG. 1G provides a perspective view of a schematic non limiting illustrative diagram of a tail portion coil core, about which coil wiring is wound.
FIG. 1H provides a perspective close up view of a schematic non limiting illustrative diagram of integrated tail portion wiring spanning the tail portion of vehicle tag.

Most preferably cover 123c surface is provided with curvature and/or arching provided to allow to it to securely fit over the curvature of the external surface of a vehicle fuel filler neck. Optionally cover 123c may be provided with a glue and/or the like adhesive about its external surface so as to provide housing 123c with the option of securely coupling with the external surface of the filler neck about which it is placed.

Most preferably cover 123c is fluid and seamless with the internal surface of band 122. Most preferably cover 123 may be adapted and/or customized to fit and/or correspond to the geometry of the filler neck surface and/or various vehicle models. Optionally cover 123 may be provided in a generic form wherein in one shape and or size may be provided to best fit all vehicle and or filler neck models or types.

Figure 1I:
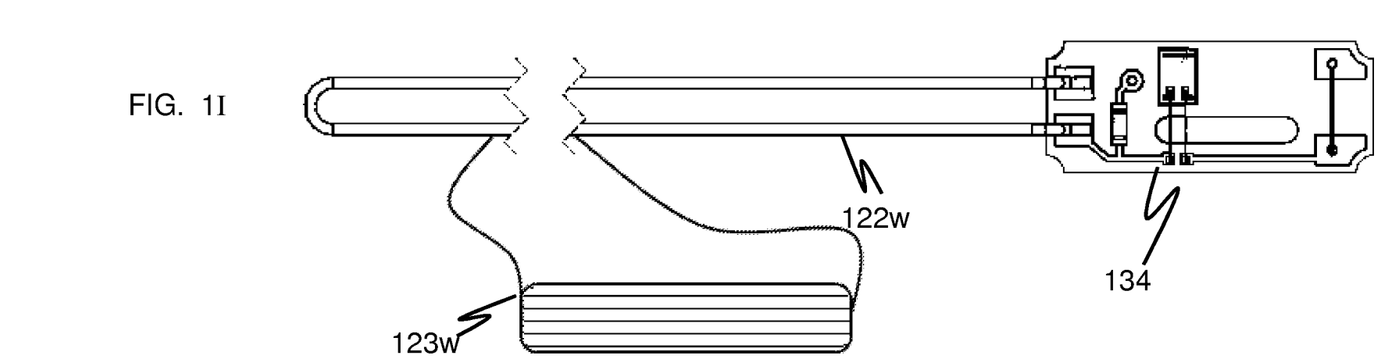
FIG. 1I-J provide a schematic depiction of integrated tail portion wiring with optional connections configuration with a coil according to optional embodiments of the present invention.

Most preferably coil wire 123w is looped about core 123c and electronically coupled with tail wire 122w. Optionally coupling tail wire 122w and coil wire 123w may be provided with a coupler, adaptor or by winding one over the other, for example as shown in FIG. 1I.

Optionally tail wire 122w and coil wire 123w may be formed from a continuous wire length.

Figure 1J:
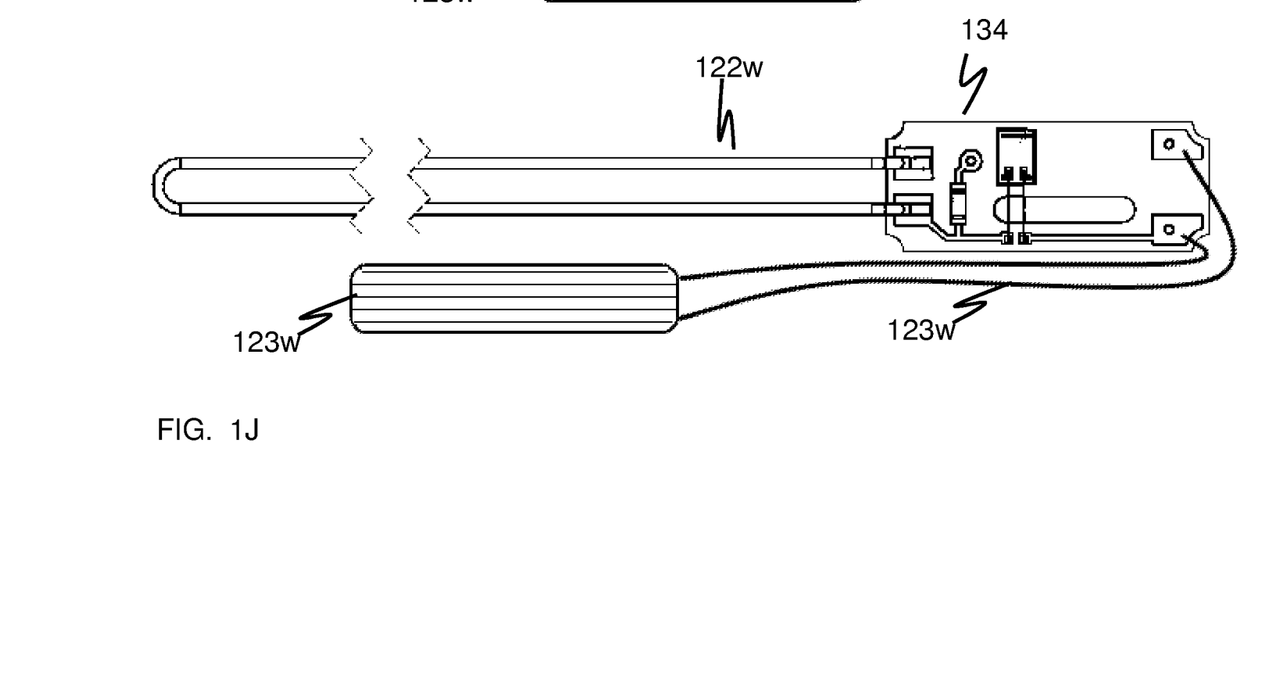

Optionally coil wire 123w looped about core 123c may be electronically coupled directly with tag circuitry 134 about at least two contacts, for example as shown in FIG. 1J.

FIG. 1H shows a close up view of wiring of tags 120/121 depicting at least one tamperproof measured provided. Most preferably tail wire 122w is electronically coupled with tag circuitry 134 and is therefore most preferably required to close the circuit to render circuit 134 functional. Therefore if tail wire 122w should become severed or otherwise cut, that would render circuit 134 in operable. Therein providing at least one tamperproof measure provided with RFID tag 120/121.

Figures 2A, 2B, 2C:
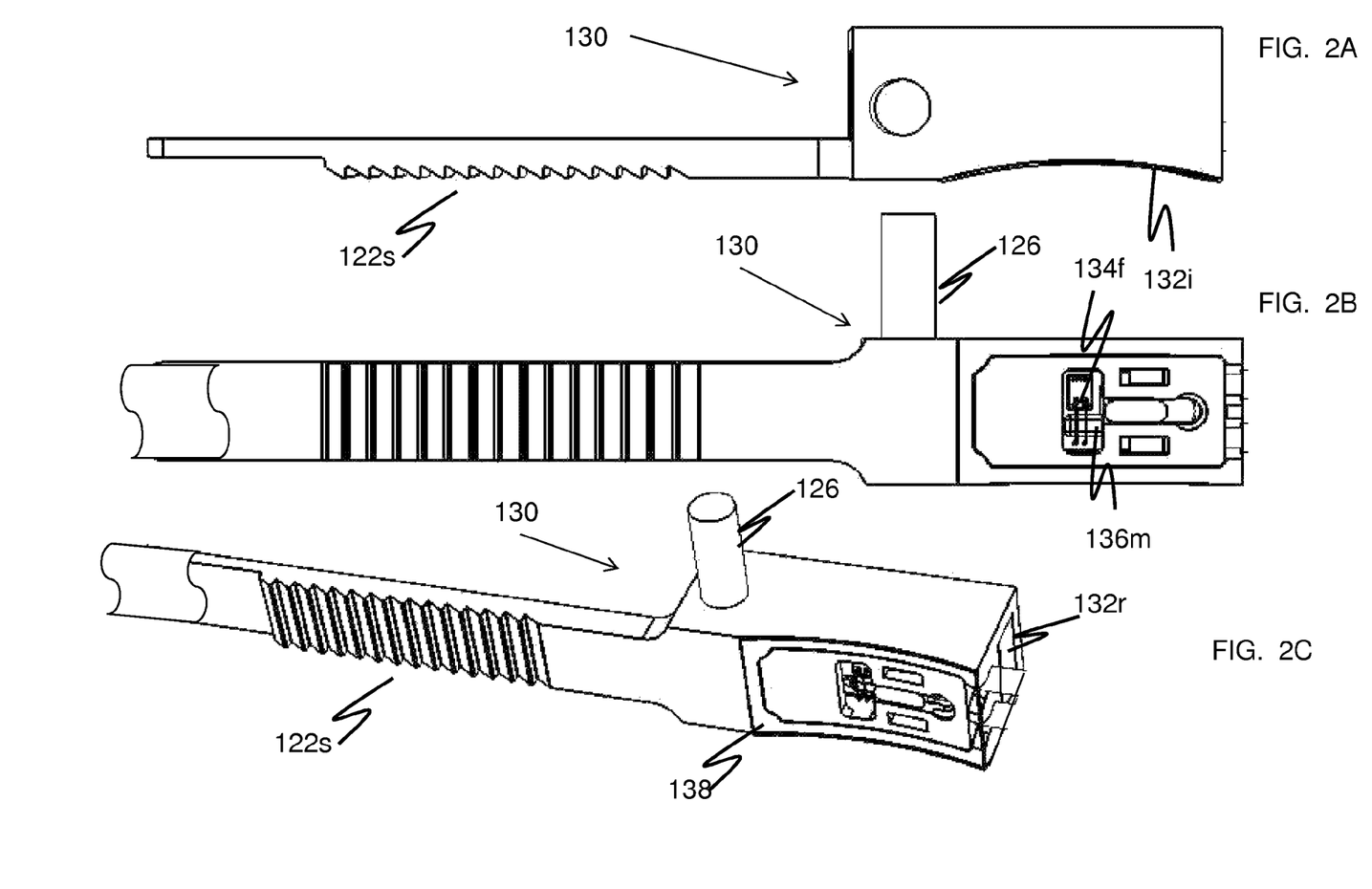
FIG. 2A-E provide varying views of a schematic non limiting illustrative diagram of the head portion of the vehicle tag device according to an optional embodiment of the present invention.
Figure 2D:
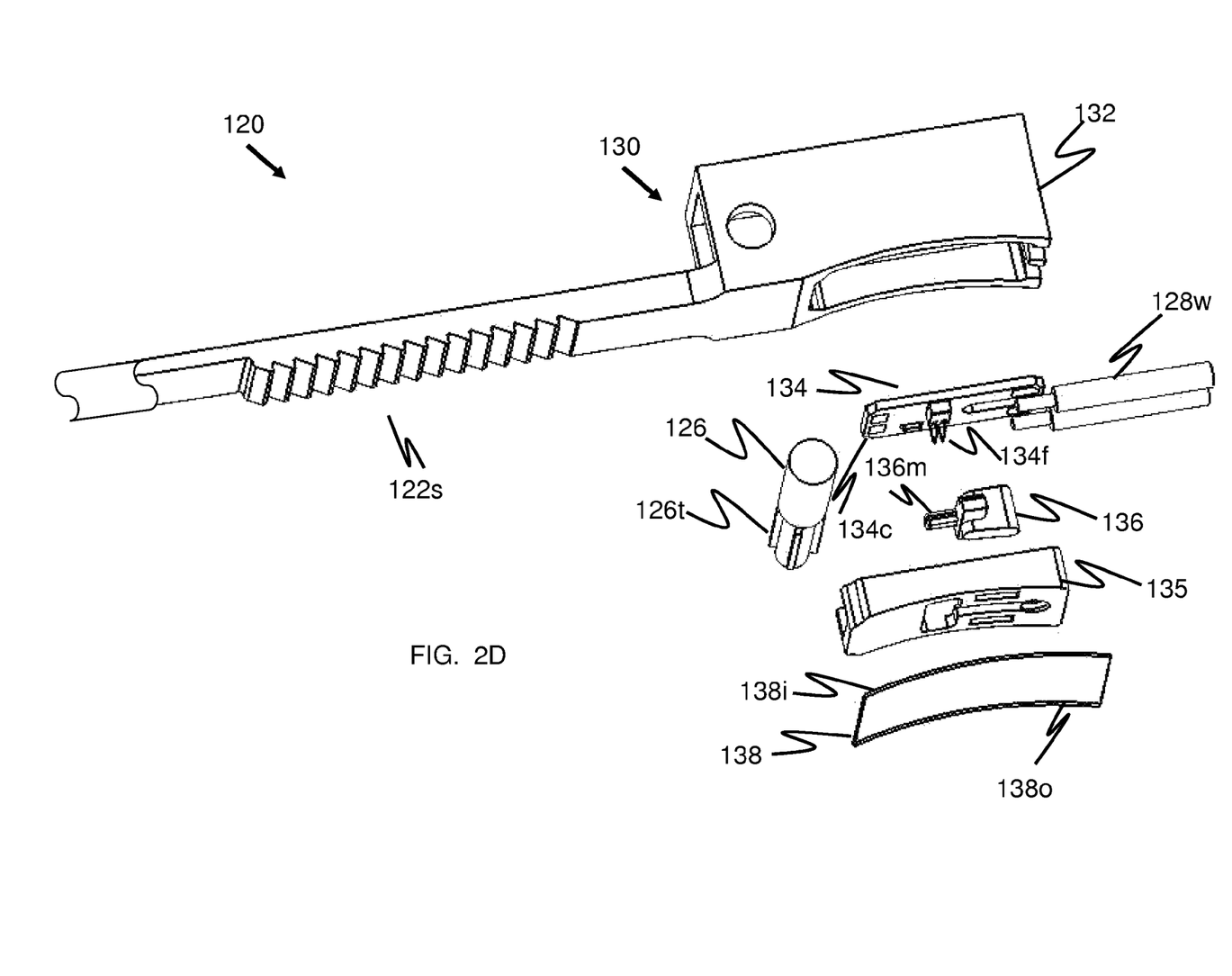

FIG. 2A-C provide optional views of a schematic illustrative example of head portion 130 according to a preferred embodiment of the present invention, while FIG. 2D provides an exploded view of head portion 130. Head portion 130 most preferably provides for housing vehicle RFID tag circuitry 134 capable of associating with a plurality of optional automatic fuel delivery authorization system known in the art, and incorporated by referenced as if fully set forth herein.

Head portion 130 comprises housing 132 having a substantially rectangular structure. Optionally the inner face and/or surface of housing 132i may be provided with a curvature 132i so as to allow for improved coupling and/or association with the surface of the filler neck at the pending attachment site. Most preferably housing 132 may be adapted and/or customized to fit and/or correspond to the geometry of the filler neck surface and/or various vehicle models. Optionally housing 132 may be provided in a generic form wherein one shape and or size may be provided to best fit all vehicle and or filler neck models or types. Housing 132 may further provide for associating with a fastening tool 126 (schematically showing only a portion of tool 126) so as to allow a user to fasten tail portion 122 onto the filler neck. Optionally fastening tool 126 (schematically showing only a portion of tool 126) may be provided in various forms for example including but not limited to Allen key, ratchet, nut and bolt, screw and driver, or the like.

Tail portion 122 may be threaded through housing recess 132r provided to receive tail portion distal end 122d and threaded through housing 132 and locking optionally and preferably fastening tool 126 (schematically showing only a portion of tool 126) provides for mechanical tool to drive and/or move tail portion 122 through housing 132 so as to form a loop and fasten tag 120/121.

Figure 2E:
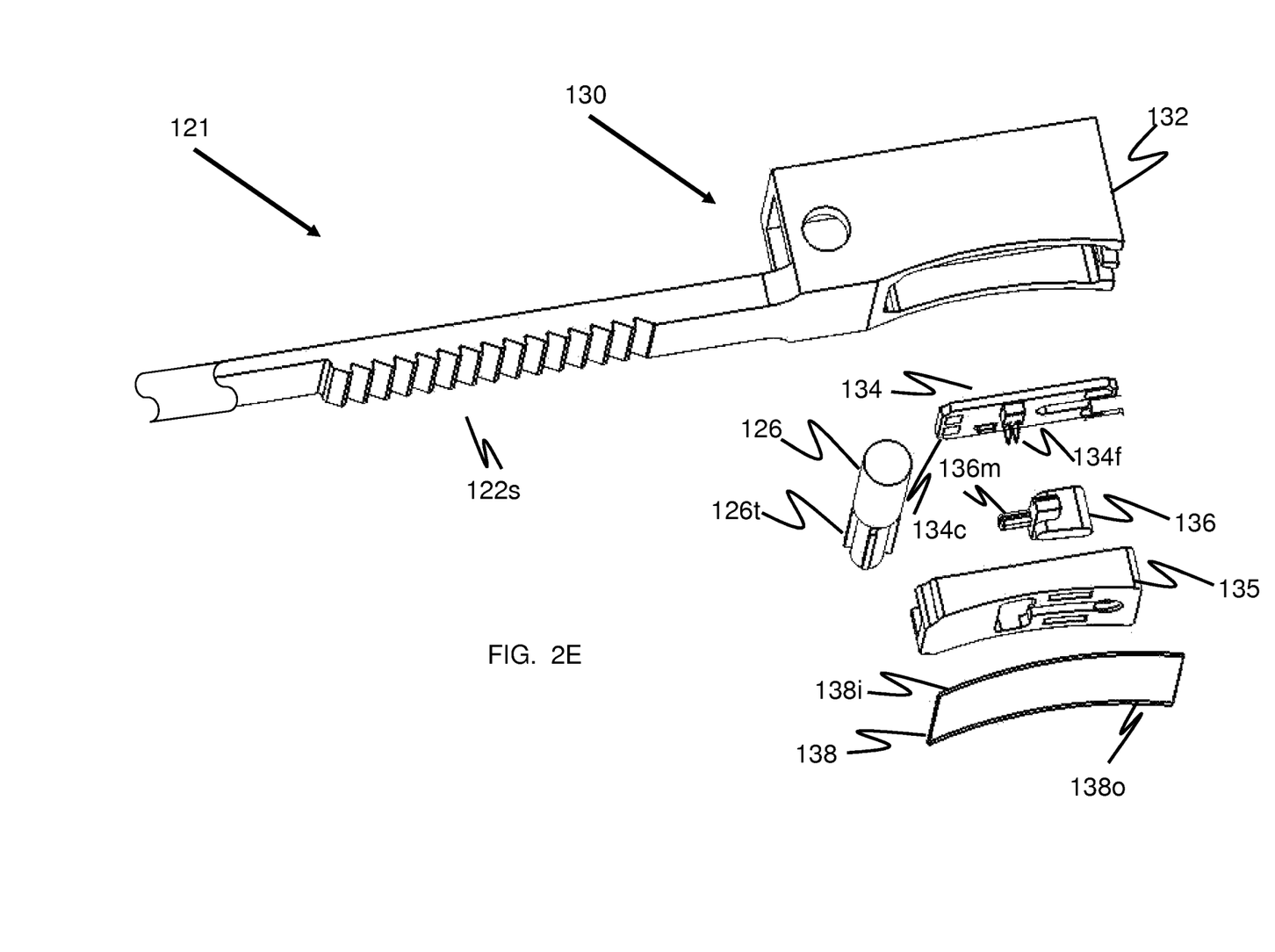

FIG. 2D-E provides an exploded view of head portion 130 comprising, housing 132, RFID tag circuitry 134, fastening tool 126, RFID circuitry housing 135, double sided glue housing cover 138. FIG. 2D shows an optional configuration adapted for tag 120 as shown in FIG. 1A-C comprising an optional connection for coil lead/wire 128w. FIG. 2E shows an optional configuration adapted for tag 121 as shown in FIG. 1D-F without coil lead/wire 128w, as they are integrated within tail portion 122, as previously described and shown in FIG. 1I-J, for example.

Optionally and preferably vehicle RFID tag circuitry 134 is most preferably provided with at least one or more, and more preferably at least two or more tamperproof measure ensuring that the tag is rendered non-functional should a tampering attempt be made, for example in the form of removing tag 120 from its installation site.

Preferably an optional and preferred tamperproof measure comprises a female circuit break recess and/or groove and/or connector 134f, FIG. 2D and a corresponding male circuit break connector 136. Most preferably female circuit break connector 134f may be provided in the form of a bonding wire disposed on circuit 134 wherein circuit break bonding wires 134f form an integral part of circuit 134 such that its removal renders circuit 134 non functional and more preferably irreparable. Preferably female circuit break connector 134f may be provided to receive and correspond to male circuit break connector 136, optionally and preferably in the form of a slider and pin 136m, may be disposed in circuit housing 135. Optionally and preferably female connector 134f corresponds with male connector pin 136m. Most preferably once connectors 134f and 136m are associated with one another they cannot be removed without breaking or otherwise rendering circuit 134 (and therein tag 120/121) nonfunctional and/or irreparable. Optionally and preferably connectors 134f and 136m are further associated with one another through double sided glue housing cover 138 comprising a first or outer glue surface 138o and a second or inner glue surface 138i. Preferably double sided adhesive housing cover 138 may for example be provided in the form of a glue strip or the like providing for further securely coupling connectors 134f and 136m, about the inner adhesive surface 138i, and further securely coupling them to the filler neck surface with the outer adhesive surface 138o.

Optionally circuit break connector 134f may be realized in the form of a male connector while male connector 136m may be realized in the form of female connector.

Most preferably circuit break connectors 134f and 136m are single use such that once they are deployed, connected or otherwise coupled they cannot be removed without rendering circuit 134 and therein RFID tag 120 nonfunctional and more preferably irreparable.

Preferably vehicle tag circuit 134 provides for an optional tamperproof measure utilizing contacts 134c that provide for establishing a closed loop circuit with a conducting wire 122w that is most preferably integrated and/or otherwise associated with tail portion 122. Most preferably tail portion conductive wire is disposed along the length of tail portion 122, and may be provided in the from of a wire or the like conductive materials able to form a closed circuit loop with contacts 134c. Most preferably the second tamperproof measure provides for preventing tampering by cutting or removing tail portion 122, where if tail 122 is cut the circuit is not closed due to contacts 134c.

Figures 3A, 3B:
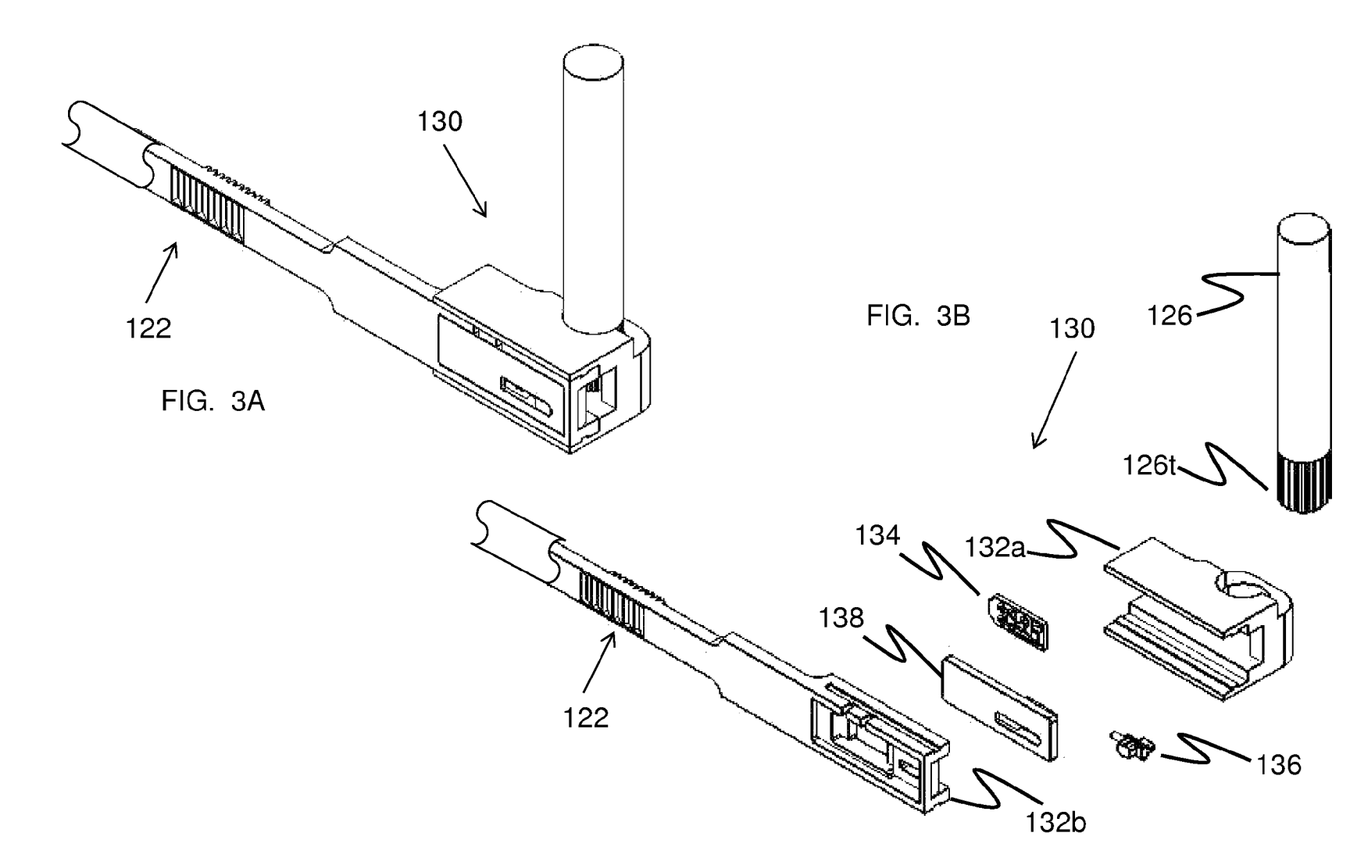
FIG. 3A-B provide varying views of a schematic non limiting illustrative diagram of the head portion of the device according to an optional embodiment of the present invention.

FIG. 3A-B provide an optional configuration of head portion 130 wherein housing 132 is provided in a rectangular form (without the curved surface 132i as shown in FIG. 2A-D) where housing 132 comprising two parts a first portion 132a and a second portion 132a.

Figure 4:
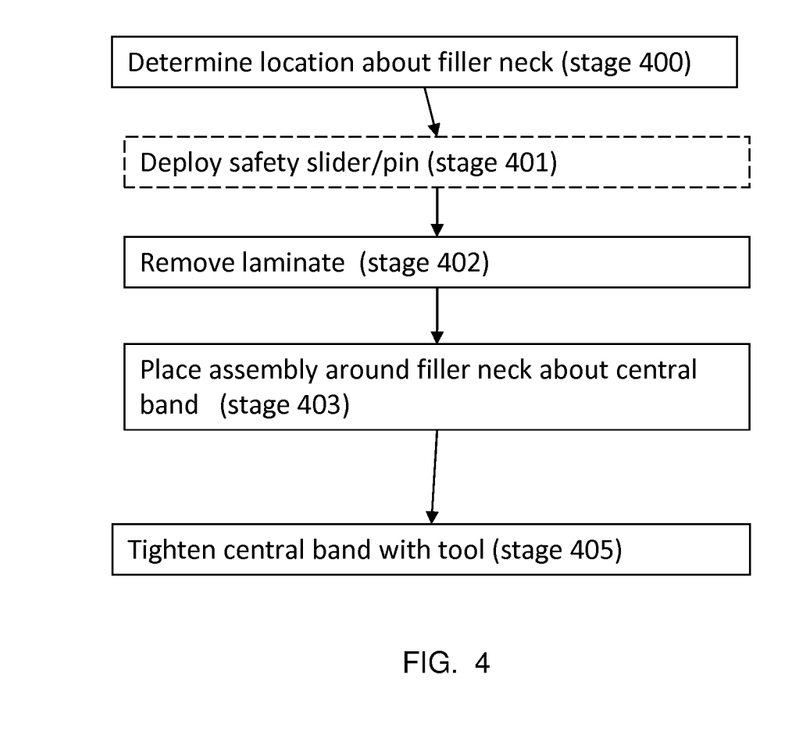
FIG. 4 shows a flowchart of optional method according to the present invention for installing the device according to an optional embodiment.

FIG. 4 depicts a method for installing the tamperproof RFID vehicle tag 120 the installation method starting in stage 400 by identifying installation location about the fuel tank filler neck. Optionally in stage 401 activation of an optional tamperproof measure about head portion 130 by deploying male circuit break connector pin 136m on slider 136 to associated with female circuit break connector 134f, preferably in the form of a bonding wires integral to circuit 134. Optionally stage 401 may be performed during manufacturing. Next in stage 402 a laminate associated with the RFID vehicle tag 120 and more preferably with double sided adhesive tag housing cover 138 is removed to uncover the outer adhesive surface 138o. Next in stage 403 assembly 100 is placed over the filler neck at the predetermined location (from stage 400) and couple with adhesive surface disposed about 138O. Finally the tail portion 122 is fastened about the filler neck (not shown).

While the invention has been described with respect to a limited number of embodiments, it will be appreciated that many variations, is modifications and other applications of the invention may be made.

What is claimed is:

1. A vehicle side RFID tag for use with an automated fuel delivery authorization system, wherein the vehicle tag is realized in the form of a band and buckle disposed about the fuel delivery filler neck, the vehicle tag comprising:
   a. a head portion for housing RFID tag circuitry, the head portion comprising:
      i. a circuit housing for housing said RFID tag circuitry and wherein said housing comprises a male circuit break connector;
      ii. wherein said RFID tag circuitry comprises a female circuit break connector adapted to receive and correspond to said male circuit break connector; said female circuit break connector is provided in the form of bonding wire disposed on said RFID tag circuitry forming a recess into which said male circuit break connector fits; said circuit break bonding wires are adapted to form an integral part of said RFID tag circuitry, wherein cutting or severing said bonding wires renders said RFID tag circuitry non-functional or irreparable;
      iii. wherein said circuit housing comprises a circuit housing cover, wherein said cover comprises a first surface and a second surface and wherein both first and second surfaces are provided with an adhesive surface therein forming two adhesive surfaces about said circuit housing cover; and wherein said cover is adapted to securely fasten said female circuit break connector and said corresponding male circuit break connector in their coupled state onto said first surface of cover; and wherein said second surface of said cover is adapted to be coupled with the surface of a fuel delivery filler neck therein providing for a tamperproof measure; and
   b. a tail portion for fastening and coupling said head portion to said fuel delivery filler neck, wherein said tail portion fluidly extends from said head portion; and wherein said tail portion integrates conductive wiring provided as a tamperproof measure.

2. The device of claim 1 wherein said head portion further comprises a tamperproof measure.

3. The device of claim 1 wherein said tail portion forms a RFID antennae coil.

4. The device of claim 1 wherein said tail portion further comprises an integrated RFID antennae coil.

5. The device of claim 4 wherein said integrated coil and said integrated conductive tail wiring are provided from continuous conductive wiring.

6. The device of claim 4 wherein said integrated coil and said integrated conductive tail wiring are electronically coupled utilizing at least one coupling method selected from the group consisting of male/female coupler, male female connectors, soldering, gluing, welding, inter-wire winding, or any combination thereof.

7. The device of claim 1 wherein the adhesive surface about said second surface is covered with a removable laminate that may be peeled to expose said second adhesive surface.

8. The device of claim 1 wherein said head portion further comprises a recess to receive a tail portion fastening tool provided to fasten said tail portion relative to said head portion.

9. The device of claim 1 wherein said RFID tag circuit further comprises at least two electrical contacts provided to electrically couple with said integrated conductive wiring disposed along the length of said tail portion, wherein cutting or severing said integrated conductive wiring renders said RFID tag circuitry non-functional or irreparable.

10. The device of claim 1 wherein said tag circuit further comprises at least two electrical contacts for coupling a RFID antennae coil.

11. The device of claim 10 wherein said RFID antennae coil is integrated within said tail portion.

12. An apparatus for easy installation of a vehicle RFID tag about a fuel delivery filler neck the apparatus comprising:
   a. the vehicle tag according to claim 10; and an
   b. RFID antennae coil; and
   c. a plurality of peripheral bands provided for bridging and coupling said RFID coil within said vehicle tag.

13. A kit for easy installation of a vehicle RFID tag about a fuel delivery filler neck the kit comprising: a vehicle tag apparatus according to claim 12, and a fastening tool.

14. A method for installing a tamperproof vehicle tag according to claim 1 on a vehicle fuel delivery neck the method comprising:
   a. Identify installation location about said filler neck;
   b. Removing a laminate disposed about the second surface to expose the second adhesive surface of the circuit housing cover; and
   c. firmly fix said RFID vehicle tag with said filler neck about the head portion of said tag; and
   d. tighten the tail portion of said tag about said filler neck.

15. The method of claim 14 further comprising the step of arming said vehicle tag with said a tamperproof measure associated with said head portion by securely coupling a female circuit break connector with a corresponding male circuit break connector prior to removing said laminate about said second surface.

16. A vehicle side RFID tag for use with an automated fuel delivery authorization system, wherein the vehicle tag is realized in the form of a band and buckle disposed about the fuel delivery filler neck, comprising at least two tamperproof measures, the vehicle tag comprising:
   a. a head portion for housing RFID tag circuitry wherein said head portion provides a first tamperproof measure; and
      i. wherein said tag circuitry is disposed in a circuit housing comprising a male circuit break connector; and
      ii. wherein said RFID tag circuitry comprising female circuit break connector adapted to receive and correspond to said male circuit break connector; and
      iii. wherein said circuit housing comprises a circuit housing cover, wherein said cover comprises a first surface and a second surface and wherein both first and second surfaces are provided with an adhesive surface therein forming two adhesive surfaces about said circuit housing cover; and wherein said cover is adapted to securely fasten said female circuit break connector and said corresponding male circuit break connector in their coupled state onto said first surface of cover; and wherein said second surface of said cover is adapted to be coupled with the surface of a fuel delivery filler neck therein providing for said first tamperproof measure; wherein an attempt to remove said cover leads to at least one or more of severing, separating, and/or decoupling said male and female circuit break connectors rendering said tag circuitry inoperable or irreparable; and
   b. a tail portion for fastening and coupling said head portion to said fuel delivery filler neck wherein said tail portion fluidly extends from said head portion; and comprises an integrated RFID antennae coil, and conductive wiring; and wherein said conductive wiring is electronically coupled with said RFID tag circuitry with at least two electrical contacts provides therein forming a second tamperproof measure wherein said RFID tag circuitry is rendered inoperable or irreparably if said conductive wiring becomes severed or cut.

17. The device of claim 16 wherein the adhesive surface about said second surface is covered with a removable laminate that may be peeled to expose said second adhesive surface.

18. The device of claim 16 wherein said coil and said conductive wiring are electronically coupled.

19. The device of claim 16 wherein said coil and said conductive wiring are individually electronically coupled to said tag circuitry.

* * * * *